United States Patent [19]
Gordon et al.

[11] 3,816,977
[45] June 18, 1974

[54] METHOD AND APPARATUS FOR BAG COLLECTION OF DIRT

[75] Inventors: Mack Gordon, Medina; John F. Phillippi, Mentor, both of Ohio

[73] Assignee: Aerodyne Development Corporation, Cleveland, Ohio

[22] Filed: Oct. 4, 1971

[21] Appl. No.: 186,373

[52] U.S. Cl............... 55/96, 55/302, 55/341, 55/380, 55/487
[51] Int. Cl............................................ B01d 46/04
[58] Field of Search....... 55/96, 282, 283, 302, 341, 55/372, 380, 262; 210/333–487

[56] References Cited
UNITED STATES PATENTS

| | | | |
|---|---|---|---|
| 1,270,042 | 6/1918 | Moisant | 210/315 |
| 2,758,671 | 8/1956 | Silverman et al. | 55/294 |
| 3,092,479 | 6/1963 | Hedberg | 55/341 |
| 3,325,979 | 6/1967 | Smith | 55/302 |
| 3,383,840 | 5/1968 | Johnson et al. | 55/341 |

FOREIGN PATENTS OR APPLICATIONS
677,502  6/1939  Germany............................. 55/380

*Primary Examiner*—Bernard Nozick
*Attorney, Agent, or Firm*—Baldwin, Egan, Walling & Fetzer

[57] ABSTRACT

A method and apparatus for collection of dirt particles utilizes two fluid permeable filter media, one within the other, at least one of which is of porous flexible material. A dirty stream of fluid passes downstream through both filter media, after which the clean stream of fluid is discharged. The dirt collected on the upstream surface of the flexible bag is separated to fall downwardly by introducing against the downstream surface of the flexible bag sufficient fluid pressure to cause at least partial collapse of the bag whereby the collected dirt is removed mechanically by the movement of the bag and also by movement of the pressurized fluid in a reverse direction through the bag.

15 Claims, 8 Drawing Figures

PATENTED JUN 18 1974

INVENTORS
JOHN F. PHILLIPPI
BY MACK GORDON

Baldwin, Egan, Walling & Fetzer
ATTORNEYS

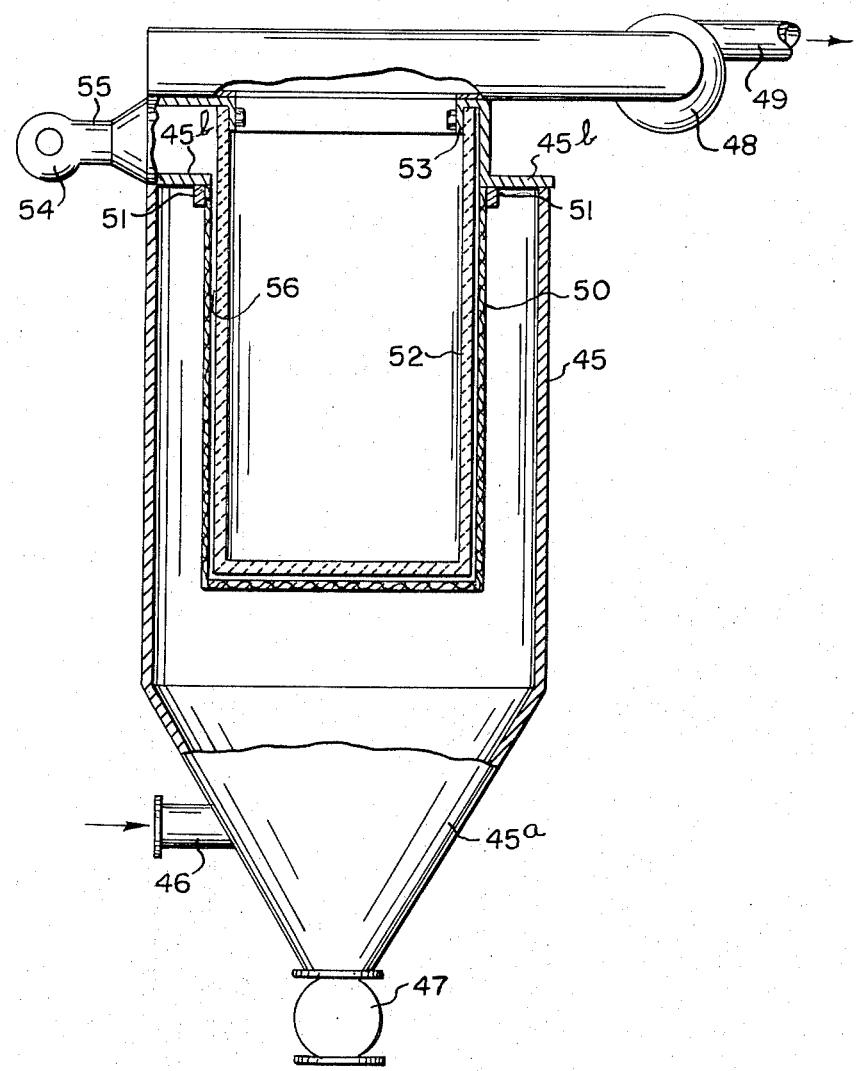

METHOD AND APPARATUS FOR BAG COLLECTION OF DIRT

The bag collection of dust is old and various ways have been utilized to release the dirt once it was collected on the bag. In some cases the prior art used compressed air to dislodge the collected dust from the bag surface which is expensive and dirty and involves moisture problems in connection with the compressed air. The present invention uses the fluid discharge from an ordinary blower or pump for cleaning purposes. In other prior art, the bag is supported on a metal structure and in dislodging the collected dirt from the surface of the bag, the bag moves repeatedly over the supporting structure which eventually wears out the bag. The present invention needs no such supporting structure. Old prior art collected dust on the interior surface of the bag, which later was shaken to dislodge the collected dust, and this type of collection involved a low air to cloth ratio (cubic feet of air per square foot of cloth) which seldom surpassed three to one. The present invention goes up to an air to cloth ratio of five or six to one.

An object of the present invention is to provide an outer bag surrounding an inner bag with a simple supporting structure, with no need for separate compartments, and a simple method of cleaning the collected dirt from the inner surface of the inner bag by introducing fluid pressure between the bags, and is simple to operate. Also, the present invention is one which is failsafe in case one of the two bags breaks, because the other bag in such a case prevents free escape of dirt as pollution.

Another object of the invention is to provide an embodiment which will resist high temperature use and which involves a permeable solid filter media adapted to withstand high temperature which is surrounded by a flexible bag of fiber glass cloth or the like wherein the dirt is collected on the outer surface of the fiber glass bag and is cleaned off by the introduction of blown-down fluid between the two filter media as taught herein.

Other objects and advantages of the present invention will be apparent from the accompanying drawings and description and the essential features will be set forth in the appended claims.

In the drawings,

FIG. 7 is a view somewhat similar to FIG. 6 but showing a modification wherein the collector housing is under suction and blow-down air is provided by opening the space between the collector bags to atmosphere; while FIG. 8 is another modification showing the use of this invention in a dirt collecting device adapted to withstand high temperature.

Figure 1:
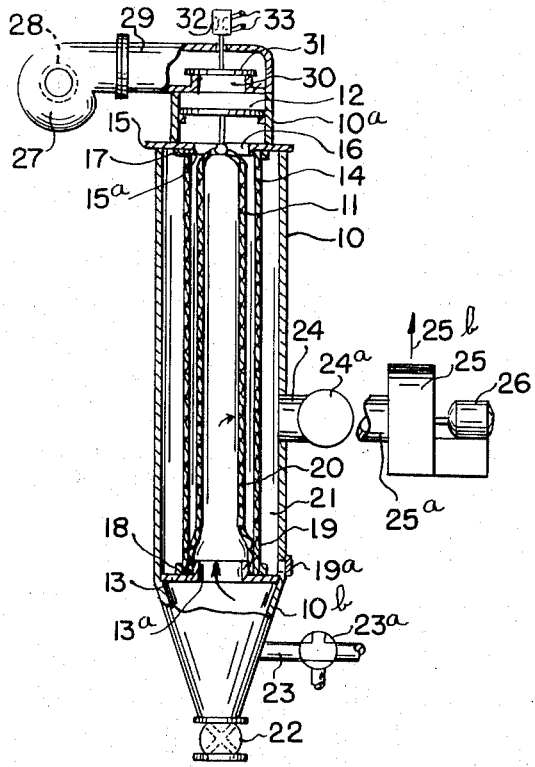
FIG. 1 is a central sectional view through a first embodiment of the present invention with the parts in dirt collecting position. A space is shown between the bags for clarity.
Figure 2:
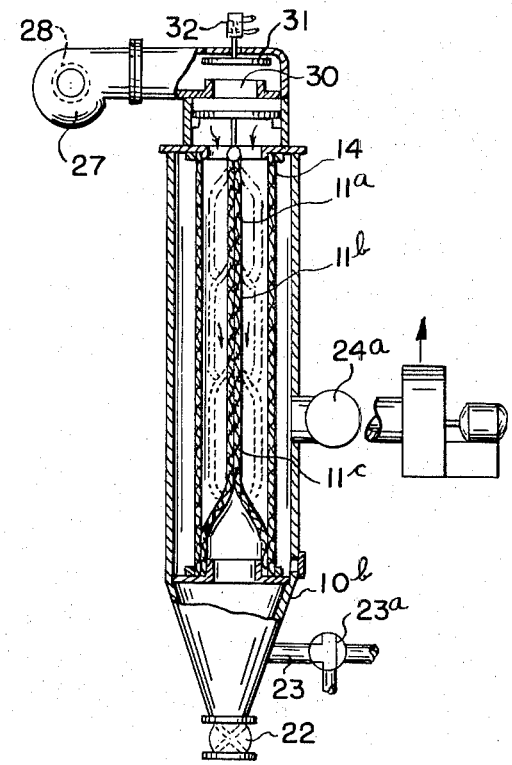
FIG. 2 is a similar view of the first embodiment showing the parts in dirt removal condition.

The first embodiment, shown in FIGS. 1 and 2, utilizes a housing 10 which, as shown, houses only a single bag collector, but in large installations one housing might contain a number of bag collectors as will presently appear. Within the housing is an elongated air-permeable bag collector 11 which is closed at the top and is supported by being suspended from an arm 12 fixed in an upward extension 10a of the housing. The bag collector 11 is open at the bottom where it is secured to an upstanding annular flange 13a of a partition 13 which otherwise closes off the bottom of the cylindrical portion of housing 10.

A second bag collector 14 surrounds the bag 11 throughout substantially its entire length and is sealed at the top around a flange 15a of a plate 15 which otherwise closes the top of the cylindrical portion of the housing 10, outside of the opening 16 the purpose of which will presently appear. The bags 11 and 14 may touch or there may be a small space of a few inches between them. An annular ring 17 holds the upper edge of bag 14 firmly in place against the flange 15a. At the bottom, a ring 18 holds bags 11 and 14 firmly against the flange 13a.

For a purpose which will later appear, it may be desirable in some cases to provide one or more openings 19 near the bottom of bag 14 to permit any dirt collecting in the annular chamber 20 between the bags to clear itself outwardly into the chamber 21 between the bag 14 and the cylindrical portion of the housing 10.

The housing has a hopper portion 10b at the bottom to receive dust collected on the interior surface of bag 11 and later discharged or removed by this invention to fall down into the hopper 10b. Means is provided at 22 at the bottom of the hopper 10b for removal of dust from the hopper. Shown in the drawings for this purpose is a well known rotary valve which allows removal of the dust without interfering with gas flow in the housing 10.

An inlet 23 is provided in the hopper 10b for the inlet of a stream of gas containing entrained dust particles in the direction of the arrow shown there. Preferable in some cases is the provision of a shut-off valve 23a for use when necessary.

An outlet for clean gas is provided at 24 communicating through the wall of the housing 10. In this case, there is shown a blower 25 driven by motor 26 which has its suction side connected at 25a to the clean gas outlet 24 and discharges the same at the outlet of the blower indicated at 25b. A valve is indicated at 24a for closing the clean gas outlet when desired.

A cleaning door is shown at 19a for the purpose of cleaning out any dust which passes through the openings 19.

Means is provided for intermittingly creating a pressurized gas differential between the bags 11 and 14 sufficient to cause at least a partial collapse of the inner bag 11, as indicated in FIG. 2, and forcing this pressurized gas through the inner bag radially inwardly, opposite to the dust collection direction of movement, so as to cause separation of the collected dust from the inner surface of the inner bag 11. This is shown in FIGS. 1 and 2 as a blower 27 driven by motor 28, whose controls are not shown but are of standard variety. A pipe 29 collects the discharge of the blower so as to guide the same into the extended portion 10a of the housing. To this end, an opening 30 leading into the extension 10a is normally closed by a valve 31 whose position is controlled by a device shown at 32 which is here shown as a cylinder and piston device having pressure fluid flow lines 33, although the device also might be a solenoid operated electrically.

The operation of the first embodiment should now be clear referring to FIGS. 1 and 2. A blower 27 is usually in continuous operation energized by the motor 28. When sufficient dust is collected on the inner surface of the inner bag 11 to require cleaning thereof, then the device at 32 is operated from the position of FIG. 1 to the position of FIG. 2 so as to open the valve 31, thus permitting the discharge from blower 27 to move downwardly through the opening at 30 and in the direction of the arrows, at the top of the bags, so as to apply pressure fluid from blower 27 between bags 11 and 14. Previous to this, if necessary, depending upon the circumstances, valve 23a may be moved to the position of FIG. 2 and 24a may be closed. However, if a plurality of cleaning units are enclosed in a single housing, as in FIG. 6, then closing the valves 23a and 24a is not necessary. The operation proceeds serially from the top downwardly as shown in FIG. 2 with the upper part of the bag first collapsing at 11a so that both vertical sides of the bag substantially touch and air from the blower 27 penetrates inwardly through the walls of bag 11 both mechanially and pneumatically causing the collected dust to be loosened to fall downwardly. This collapse of the bag 11 occurs gradually from the top downwardly, being illustrated by steps at 11b and 11c which occur one after the other until the bag has been completely collapsed substantially to the bottom thereof. At any point in this action the uncollapsed part of bag 11 acts as a valve to cause most of the air from blower 27 to act against the collapsing portion. The dust discharged from bag 11 drops downwardly into the hopper portion 10b of the housing and is later removed as desired through the rotaty valve 22, or otherwise.

The apparatus of FIGS. 1 and 2 could be operated in such a manner as to eliminate the cylindrical housing 10 and substitute therefor an open framework between the dust hopper 10b at the bottom and the structure 10a at the top which supports the valve 31 and the blower 27. This modified structure would provide the dirty stream of gas under pressure at 23 and the clean gas would be exhausted through the framework substituted for the cylindrical housing 10. Otherwise, such a modified structure would operate in the same manner as described with respect to FIGS. 1 and 2.

While the apparatus of FIGS. 1 and 2 have been described as used for collecting dust from a gas or air stream, it may also be used to remove dirt from a liquid stream under proper circumstances. In such use the blower 27 would be substituted by a liquid pump taking liquid from a clean source.

Figure 3:
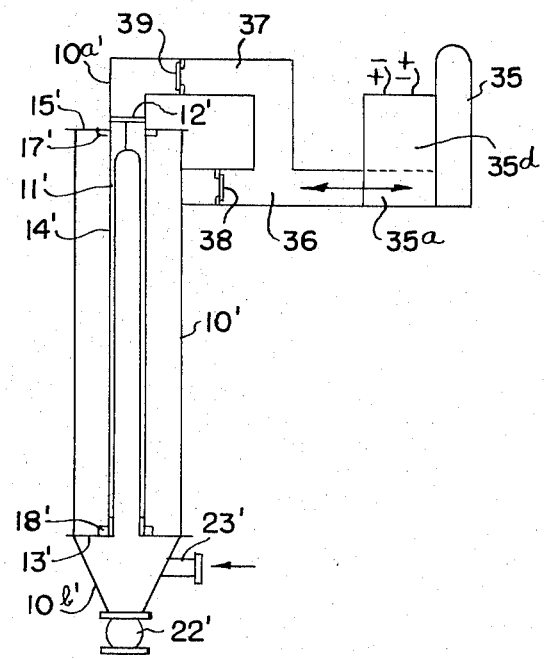
FIG. 3 is a somewhat schematic view of a second embodiment of this invention.

The second embodiment is shown in FIG. 3 in a somewhat diagrammatic manner but which will readily be understood because it is quite similar to the first embodiment. Parts having similar functions have been given the same reference characters as in the first embodiment but with a prime suffix. The housing 10' has an upward extension at 10a' in which is provided a support bar 12' from which is suspended the inner bag 11'. The outer bag 14' surrounds the inner bag for its entire length and is held between a ring 17' at the top and a ring 18' at the bottom which also may hold the lower edges of bag 11'. Here, as in the first embodiment, a preferred form has the inner bag 11' of greater air or gas permeability than the outer bag 14'. Commonly, the inner bag would be of a felted construction while the outer bag was a filament construction.

The inlet for the dirty gas stream having fine dust entrained is indicated in the lower hopper portion 10b' at 23'.

Figure 4:
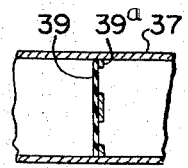
FIG. 4 is a fragmental sectional view, enlarged, showing one of the check valves of FIG. 3.
Figure 5:
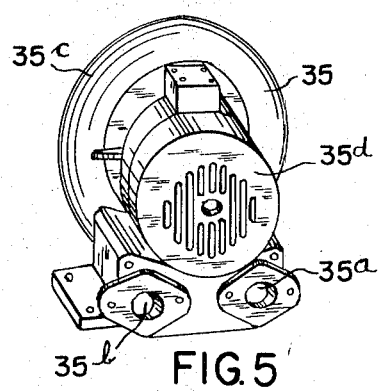
FIG. 5 is a perspective view of a particular type of blower utilized in the embodiment of FIG. 3.

In this embodiment, an unusual type of blower is provided at 35, and shown more in detail in FIG. 5, which has two ports 35a and 35b, and the blower being so constructed that with rotation in one direction a positive pressure is provided at one of the ports 35a or 35b while a negative pressure appears at the other port. Then, with reversal of rotation of the blower 35, the negative and positive ports change from 35a to 35b, and vice versa. A suitable blower of this type is sold by Siemens Corporation, Power Equipment Division, at Iselin, N. J., and is called a Side Channel Blower. Air (or other gas) enters through an intake port, such as 35a, and is admitted to a toroidal housing 35c. Within this housing is a unique, vaned impeller mounted coaxially on a shaft common with the armature of the driving induction motor 35d. The design of this impeller is such that the air is caused to flow in a spiral path, constantly accelerating as it moves toward the discharge port 35b. As stated previously, upon reversal of the rotation of the motor and the impeller, the flow is caused to change in direction so that 35b becomes the intake port and 35a is the discharge port. Diagrammatically, FIG. 3 shows ports 35a and 35b separated so that the operation of this invention will be understood. Connected with the port 35a is a passageway 36 communicating directly with the upper portion of the cylindrical housing portion 10' and by-pass passageway 37 communicates between passageway 36 and the upper portion 10a' of the housing so that the discharge traveling through the by-pass will enter between the bags 11' and 14' at the upper end thereof. In the passageway 36 is a check valve 38 opening only to permit flow toward the right as viewed in the drawings and away from the housing 10'. In the by-pass passageway is a check valve 39 which is arranged to open only toward the left as viewed in the drawings or to permit flow toward the housing extension 10a'. The details of by-pass valve 39 are shown in FIG. 4 as comprising a flexible flap secured at the top only at 39a and normally closed by pressure at the left-hand side of the valve, but opened upon a differential pressure greater at the right-hand side of the valve.

The operation of this second embodiment should now be clear from the description just given. With the motor 35d causing rotation in the direction to provide suction at the port 35a, the check valve 38 opens while the check valve 39 remains closed. Dirty air, or gas, is then drawn through the inlet 23' upwardly through the interior of the inner bag 11', then radially outwardly through the bags 11' and 14' and discharged through the passageway 36 and through the blower 35 and out through the port 35b. When it is desired to clean the collected dust from the inner surface of the inner bag 11', then the direction of the motor 35d and of the blower 35 is reversed so as to cause a positive pressure at port 35a which causes valve 38 to close and causes valve 39 to open allowing the discharge from the blower 35 to pass through by-pass 37, and then downwardly between bags 11' and 14' to cause the gradual collapse of the inner bag from the top downwardly as described in connection with FIG. 2 of the first embodiment. The displaced dust falls downwardly into the hopper portion 10b' and is removed through a rotary valve 22' or otherwise as desired.

In one embodiment of this invention, the permeability of the inner bag 11 was 60 and the permeability of the outer bag 14 was 12 when measured on a Frazier tester which is the A.S.T.M. standard for permeability. As mentioned previously, however, the outer bag might have the greater permeability and then in order to collapse the inner bag for cleaning as taught by this invention, it is necessary to feed enough air between the bags at the top to build up the pressure between the inner and outer bags faster than it can escape through the outer bag.

The openings indicated at 19, associated with the cleaning door 19a, allows any existing dust which bleeds through the bag 14 to escape at the bottom through the clean air section which is chamber 21.

In the operation of this invention, it should be understood that the inner bag 11 or 11' acts as a valve so that the air at first is forced through a small section of the bag 11 near the top, as shown at 11a, and this action moves downwardly, gradually collapsing more and more of the inner bag until it is completely collapsed near the lower end thereof.

This invention will operate equally well with bags which are generally cylindrical or with other bags which are more of the envelope type, that is, with generally parallel sides, but which can be collapsed by this invention as shown in FIG. 2.

It should be understood that the height or length of the bags may be varied when using this invention because of the character of the cleaning method disclosed herein.

Figure 6:
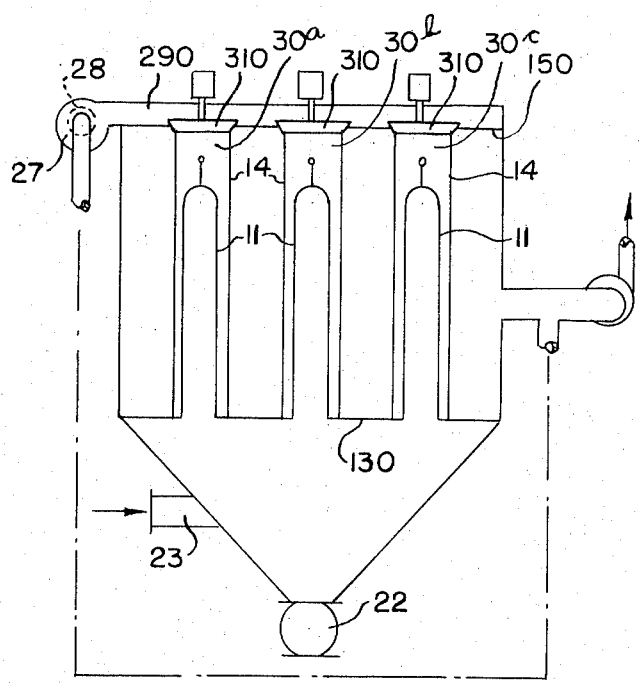
FIG. 6 is a somewhat diagrammatic view showing a plurality of the devices of FIGS. 1 and 2 assembled in a single housing.

This invention does not require separate compartments when utilizing a plural number of cleaning units of the type decribed herein. For instance, three cleaning units might be placed in one housing, as shown in FIG. 6, and using this invention one might reverse one of the units for cleaning purposes while leaving the other two cleaning units on the line to continue the cleaning operation. In such a case, one could utilize one tube sheet or partition 130 at the bottom with several openings into a single hopper section. Also, at the upper end, there could be a single tube sheet 150 having separate openings 16 and the passageway 290 could be manifolded with several openings 30a, 30b, 30c in position to communicate with the manifold and having their individual control valves 310. This permits the cleaning operation of each unit separately or a group of units at one time, if desired. Utilizing the second embodiment of this invention, plural units could be mounted in a single tube sheet 13' at the bottom and a single tube sheet 15' at the top, and then any one unit could be shut down for cleaning by simply reversing its motor 35d, while leaving all of the other units operating.

It is within the scope of this invention to set up regular cleaning cycles using a timer to operate the element 32 and to energize motor 38 in the first embodiment, or to reverse the motor 35d in the second embodiment.

Figure 7:
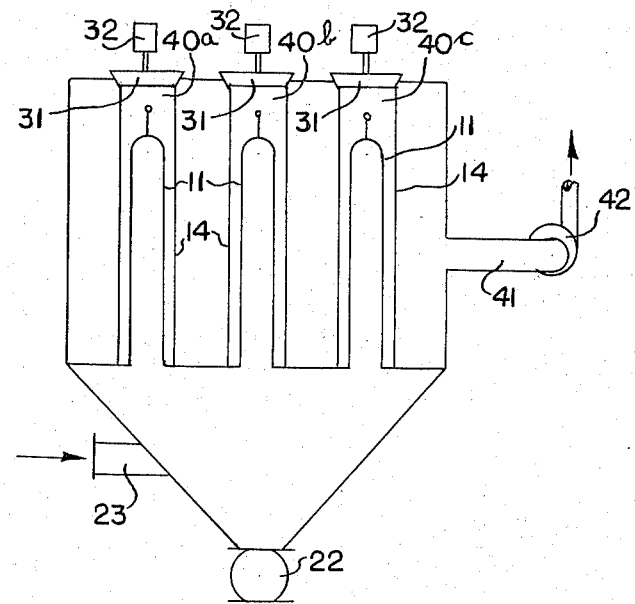

Note that the two bags of this invention, in a structure as shown in FIG. 7, might be exposed to atmosphere if the collector is operated under suction exerted at outlet 41 by blower 42. The collector units in FIGS. 6 and 7 are exactly like those in FIGS. 1 and 2.

Some prior art devices are required to use stainless steel for the housing 10 or 10' and the associated parts as indicated at 10a and 10b because of contamination or corrosion problems. However, with the present invention, stainless steel is needed only for the hopper 10b or 10b', because all of the rest of the housing is in touch only with clean air.

Note that when the present invention is in operation, if either of the bags 11 and 14 breaks, the other bag will intercept the dust in the dirty air stream before it is exhausted at 24, 36, so that dirt does not pollute the atmosphere until the broken bag can be replaced.

One embodiment of this invention using a Siemens Side Channel Blower, Model 2CH6, rated at 140 cubic feet per minute at 20 inches water gauge, could utilize this invention at an air to cloth ratio of approximately five to one, which would call for approximately 30 square feet of cloth at the 140 c.f.m. rating. This cloth might be utilized in a bag approximately 6 inches in diameter and 10 feet high. Such a bag would use one of the Siemens' blowers as described, while three units in a single compartment would take care of about 420 cubic feet per minute at the same air to cloth ratio and would require three of the Siemens' blowers Model 2CH6.

Another embodiment of this invention is shown in FIG. 8. Here a housing 45 has a hopper bottom 45a for dust collection, an inlet for a dust bearing air stream at 46, and a valve 47 for the removal of dust from the hopper. The air stream is drawn through the housing by means of an induced draft fan 48 and the clean air is exhausted at 49.

Two filter media are provided in series inside the housing 45. The upstream medium 50 is a porous flexible bag, preferably one made of fiber glass or refractory fiber to withstand high temperatures. This is sealed to a housing partition 45b shown at 51. The downstream filter medium 52 is preferably of a porous solid material such as sintered metal or a porous ceramic. The media 50 and 52 may touch or may have a slight space between them. The medium 52 is supported from the top by a ring 53 connected with the housing.

In the operation of this embodiment, dust collects on the outer face of the bag 50 and the air stream then passes through the medium 52 and out to the fan 48 and the discharge 49. For blow-down purposes, a blower 54 is connected by its discharge duct 55 to the space 56 between the media 50 and 52. To take care of the blow-down period, either a plurality of the filter units may be housed in a single housing as shown in FIGS. 6 and 7 so that the blow-down air will exhaust through the units which are still operating, or a three-way valve might be provided as in FIGS. 1 and 2 to provide for exhaust of the blow-down air. During blow-down, the air works downward progressively in a manner similar to FIG. 2, with the unexpanded portion of bag 50 acting as a valve to cause most of the air from blower 54 to act against the expanding portion.

The embodiment of FIG. 8 could be used to remove finely divided dirt from a liquid stream. In such case, a liquid pump is substituted for the blower 54 and connected to a supply of clean liquid.

In every case, this invention provides a simple dust collecting apparatus having very few parts to wear out, quickly and easily cleaned, and having favorable ratio between bag area and cubic feet of air handled.

Wherever "cloth" is used herein in the specification or claims, it means a porous, flexible fabric woven, felted, quilted, or knitted from any filament.

In every embodiment of this invention the two closely adjacent filter media are free of mutual attachment over substantially their entire dirt collecting surfaces.

What is claimed is:

1. A method for collection of fine dirt, comprising passing a fluid stream containing entrained dirt particles in a first direction downstream serially through two closely adjacent tubular porous filter media, of which at least the upstream tubular filter medium is as flexible as cloth, whereby to collect most of said dirt particles on the upstream surface of said upstream filter medium, said two filter media being free of mutual attachment over substantially their entire dirt collecting surface sufficiently to permit flow of fluid between said two filter media from end to end thereof, intermittingly applying pressurized fluid between said two tubular filter media exerting pressure against the downstream surface of said upstream tubular filter medium causing flexing of the latter and causing flow of said pressurized fluid in a direction opposite to said first direction whereby to dislodge dirt collected on said upstream surface of said upstream tubular filter medium.

2. A method for collection of dirt as defined in claim 1, wherein said filter media are concentric, vertically supported, inner and outer bags, whereby said dirt is collected on the inner surface of said inner bag, intermittingly creating a pressurized fluid differential between said bags sufficient to cause at least partial collapse of said inner bag and forcing pressurized fluid through said inner bag in an upstream direction causing separation of said collected dirt from the inner surface of said inner bag, and removing said collected dirt from the lower end of said inner bag.

3. A method as defined in claim 2, wherein said bags are close together, said pressurized fluid is introduced under pressure near the top of said inner bag, and said collapse of said inner bag travels from the top thereof downwardly.

4. A method as defined in claim 2, including the step of stopping said passing of said stream of fluid containing dust particles in said first direction through said bags prior to creating said pressurized fluid differential between said bags.

5. A method as defined in claim 1, wherein there are a plurality of units, each comprising two of said closely adjacent filter media, a dirt hopper below said units, said method including the step of applying said pressurized fluid against the downstream surface of said upstream filter medium of one of said units while continuing to operate another of said units in a dirt collecting manner.

6. Apparatus for the collection of dirt entrained in a fluid stream, comprising a housing, an upstream elongated permeable bag suspended vertically in said housing, said bag closed at one end and open at the other, a downstream elongated permeable tubular filter medium mounted in said housing spaced from said bag concentric with and closely adjacent said upstream bag for substantially the entire length of said bag, said bag and filter medium being free of mutual attachment over substantially their entire dirt collecting surfaces sufficiently to permit flow of fluid between said two filter media from end to end thereof, there being an inlet for a dirty fluid stream in said housing and a passageway connected with and communicating directly between the inlet and with the open end of said upstream bag, means sealing said dirty stream from said downstream filter medium and from said passageway except through said upstream bag, said housing enclosing the space outside of said bag and said filter medium, there being an outlet for cleaned fluid communicating with said housing space downstream of said tubular filter medium, means for creating a pressure differential between said inlet and said outlet to cause a dirt collecting fluid flow to pass between them, means for intermittingly creating a fluid pressure between said bag and said tubular filter medium including a passageway connected with and communicating between a source of pressure fluid and said space between said bag and said tubular filter medium sufficient to penetrate said bag usptream to thereby remove dirt collected on the upstream surface of said bag so that it falls downwardly, and means for discharging said removed dirt finally from the lower end of said housing.

7. Apparatus as defined in claim 6, wherein said means for creating a pressure differential between said inlet and said outlet comprises a blower in communication with said outlet, and said means for creating a gas pressure between said bag and said filter medium comprises an opening to atmosphere communicating with the space between said bag and said filter medium and means for opening and closing said last named opening.

8. Apparatus as defined in claim 6, wherein said upstream bag is of heat resistant material such as fiber glass cloth, and said filter medium is a heat resistant gas-permeable solid such as sintered metal or porous ceramic.

9. Apparatus as defined in claim 6, wherein said filter medium is a second bag outside of said upstream bag.

10. Apparatus as defined in claim 9, wherein said means for creating a fluid pressure between said bags includes blower means and a blow-down passageway communicating from said blower means to the space between said bags near the top of said upstream bag, together with means for controlling said blower and the flow in said blow-down passageway.

11. Apparatus as defined in claim 10, wherein said blower means is reversible as to direction of rotation having positive and negative pressure ports respectively changing upon blower means reversal, one of said ports communicating by a first passageway common to said blow-down passageway and to said clean fluid outlet, the other of said ports communicating by a second passageway to a clean fluid disposal point, and a check valve in said clean fluid outlet opening only toward said blower means and a check valve in said blow-down passageway opening only toward said space between said bags, whereby rotation of said blower means in a first direction causes suction at said clean fluid outlet without any effect on said blow-down passageway and reversal of rotation of said blower means in a second direction cuts off suction at said clean fluid outlet, while creating said fluid pressure between said bags.

12. Apparatus for collection of finely divided particles entrained in a dirty fluid stream, comprising a frame, upstream and downstream filter members suspended in said frame, said members being of sleeve shape and spaced one inside of the other, said upstream and downstream filter members being free of mutual attachment over substantially their entire dirt collecting surfaces sufficiently to permit flow of fluid between said two filter members from end to end thereof, means including structural members fixed and associated between said frame and said filter members for permitting direct access of a dirty fluid stream only to the upstream surface of said upstream filter member and access of said dirty fluid stream to said upstream face of said downstream filter member only through said upstream member, means whereby application of a pressure differential between said upstream face of said upstream filter member and said downstream face of said downstream filter member will cause passage of said stream serially through said upstream and downstream filter members in that order, whereby to collect said particles on the upstream surface of said upstream member, and means for intermittingly applying a pressurized fluid between said filter members including a passageway connected with and communicating between a source of pressure fluid and said space between said sleeve shape filter members to cause a pressure against the downstream surface of said upstream filter member sufficient to dislodge a major portion of said collected particles from said upstream surface of said upstream filter member.

13. Apparatus as defined in claim 12, wherein said upstream filter member in use is more flexible than said downstream member, and said upstream member is inside said downstream member.

14. Apparatus as defined in claim 12, wherein said upstream filter member in use is more flexible than said downstream member, and said upstream member is outside said downstream member.

15. Apparatus as defined in claim 12 wherein said upstream filter member has a greater permeability with respect to said pressurized fluid than said downstream filter member.

* * * * *